(12) United States Patent
Chen et al.

(10) Patent No.: US 8,453,935 B1
(45) Date of Patent: Jun. 4, 2013

(54) BROADBAND RFID LABEL (TAG) ANTENNA FOR METAL

(75) Inventors: Wen-Shan Chen, Tainan (TW); Wei-Chiang Jhang, Tainan (TW)

(73) Assignee: Southern Taiwan University, Tainan (TW)

( * ) Notice: Subject to any disclaimer, the term of this patent is extended or adjusted under 35 U.S.C. 154(b) by 0 days.

(21) Appl. No.: 13/342,458

(22) Filed: Jan. 3, 2012

(51) Int. Cl.
*G06K 19/02* (2006.01)

(52) U.S. Cl.
USPC .......................... 235/488; 235/487; 235/492

(58) Field of Classification Search
USPC ...................... 235/488, 487, 492, 383, 385
See application file for complete search history.

(56) References Cited

U.S. PATENT DOCUMENTS

| | | | |
|---|---|---|---|
| 7,936,313 B2* | 5/2011 | Hockey et al. | 343/797 |
| 2003/0067414 A1* | 4/2003 | Cole et al. | 343/742 |

FOREIGN PATENT DOCUMENTS

| | | |
|---|---|---|
| TW | 200905973 A | 2/2009 |
| TW | 200908204 A | 2/2009 |
| TW | I306218 B | 2/2009 |
| TW | 200913377 A | 3/2009 |
| TW | I315053 B | 9/2009 |

* cited by examiner

*Primary Examiner* — Karl D Frech
(74) *Attorney, Agent, or Firm* — Muncy, Geissler, Olds & Lowe, PLLC

(57) ABSTRACT

The present invention relates to a broadband RFID (Radio Frequency Identification) label (tag) antenna that includes a base, a label chip, and an antenna module. The present invention is applicable in a surface of a metal object. Thereby, a microstrip antenna with a miniaturized label antenna is accomplished. Moreover, a dual mode is applied for conquering problems brought about by the narrowband of the microstrip antenna, and the antenna is bended and miniaturized. Accordingly, preferable impedance match is achieved between the antenna and the chip.

5 Claims, 9 Drawing Sheets

BROADBAND RFID LABEL (TAG) ANTENNA FOR METAL

BACKGROUND OF THE INVENTION

1. Field of the Invention

The present invention relates to a broadband RFID label (tag) antenna; a dual mode is applied for conquering problems brought about by the narrowband of the microstrip antenna; one mode is formed by symmetrical full-wave resonance, and the other mode is formed by unsymmetrical full-wave resonance; thereby, the antenna could be bended and miniaturized; a preferable impedance match is achieved between the antenna and a chip; the present invention could be applied in a surface of a metal object.

2. Description of the Related Art

Existing RFID is bended for miniaturizing the integral area of the label antenna so as to decrease the manufacturing cost. Wherein, a back of a radiation body is added with metal, and a microstrip antenna is contributed. In order to conquer problems of narrowband brought about by the microstrip antenna, a first plane drilling hole of the antenna and the metal disposed at the back would be connected by copper posts. Thereby, the antenna easily results in effects of broadband.

An R.O.C. patent publication No. TW200905973 showing "RFID TAG AND METHOD FOR MANUFACTURING RFID TAG" provides an RFID tag with independently and easily adjustable (controllable) resistive components and reactive components of impedance for achieving miniaturization easily. Therefore, the RFID tag of the invention comprises an antenna conductor, a first feed electric conductor for electromagnetic induction coupling the antenna conductor and an annular second feed electric conductor electrically connecting to the first feed electric conductor.

Another R.O.C. patent publication No. TW200908204 is a type of "RFID TAG AND ITS MANUFACTURING METHOD" where one of the goals is to provide an RFID tag capable of preventing gain decrease and of easy adjustment to match the chip it carried. The RFID tag comprises a ring antenna pattern that connects to an electrical contact of the chip; and a conducting element that conducts to a portion of the antenna pattern. Concurrently, a coupling part is introduced by a coupling portion and a section of a radiation metal wire. A tuning part is electrically connected to the connecting element.

Another R.O.C. patent publication No. TW200913377 showing "RFID TAG AND METHOD FOR MANUFACTURING RFID TAG" provides a wireless tag corresponding to metal having a wider passband (frequency to communication distance) characteristic than before is realized. The wireless tag comprises a first oscillator pattern having a chip connection portion to which a chip is connected and an inductance portion for adjusting impedance match with the chip and a second oscillator pattern to which power is supplied by electromagnetic induction combination via the inductance portion.

Another R.O.C. patent No. 1306218 showing "RFID TAG FOR METAL" provides a dielectric base attached with an antenna having electrically conductive materials. A radio communication IC is further electrically connected to the antenna. The antenna has a radiation portion and a grounding portion. The radiation portion is formed on a surface of the dielectric base, and the grounding portion is formed on a back of the dielectric base. The complete antenna achieves a resonance mode or a radiant mechanism. The radio communication IC is electrically connected between the radiation portion and the grounding portion. Thereby, this structure allows the RFID on metal objects to be precisely read or written in accordance with a reader.

Another R.O.C. patent No. 1315053 showing "RFID TAG" provides an antenna having a dipole conductor pattern, and an integrated circuit transistor connected to the RFID tag. The RFID tag further has an adjusting part including at least one adjusting pattern that is connected to the conductor pattern, so that the antenna could be suited to an environment, and a label part. A direction of operation while using the adjusting part indicates the label part.

Afore disclosures have shortcomings as follows:

1. The radiation body has limiting area, thereby incurring reduced radiation efficiency and shortened transmission distance.
2. The existing RFID tag is weak in restraining metal interference, hence resulting in larger return loss.
3. The antenna is restricted since the radiation body provides unsatisfactory area; thus, the bandwidth is narrower.
4. No dual mode and double resonance are provided, so the application is further limited.

Accordingly, although the existing RFID tag is able to provide basic radio communication in accordance with a certain bandwidth, the radiation efficiency, the transmission distance, the interference restraining ability, and the entire design are incapable of being satisfactorily applied in practice due to afore defects.

As a result, the existing RFID tag needs amendment for providing better choices and meeting the current industrial trend.

SUMMARY OF THE INVENTION

As the technology improves, RFID applied in storehouses gets popular. Nonetheless, the cost of RFID tag is high, and the impedance easily changes since the RFID tag is attached to objects. Thus, in order to remove afore two problems, the present invention provides a miniaturized broadband RFID label antenna that is not interfered by metal.

The miniaturized label antenna of the present invention is applied to a surface of metal object and belongs to a novel microstrip antenna. A dual mode is adopted for conquering narrowband problems brought about by traditional microstrip antenna, and the antenna is bent for shrinking its size. Further, a favorable impedance match is provided between the antenna and a chip. Wherein, the bandwidth of the impedance (Return loss >6 dB) is about 145 MHz (790 MHz to 935 MHz). North America, Europe, Japan, Taiwan, Australia, Korea, China, and other countries are included.

The present invention is to solve problems existing in the conventional RFID tag that has shortcomings like the radiation efficiency, the transmission distance, the interference restraining ability, and the entire design. Preferably, the present invention is proposed to enhance the practical technology at present. On one part, the present invention augments the ability for restraining interference; on the other part, the radiant efficiency and the transmission distance are both advanced, and the antenna is simplified. Whereby, existing functions are still contained in the present invention, which allows the present invention to more meet current industry needs.

In order to accomplish the foregoing objects and goals, a broadband RFID label (tag) antenna comprises a base, a label chip, and an antenna module; details are as follows:

A broadband RFID label (tag) antenna for metal comprises:

a base having a first plane and a second plane;

a label chip being disposed on the first plane of the base;

an antenna module disposed on the first plane of the base, and the antenna module including a first beeline at a middle of the antenna module; the label chip is disposed at a middle of the first beeline; a first L-shape section and a second L-shape section being respectively and symmetrically extended from the first beeline; a second beeline being vertically connected to the first beeline and the first L-shape section; the second beeline including a first end and a second end; the first end being vertically connected to a third beeline, and the second end being connected to a first neck portion that is further connected to a first rectangle portion; a fourth beeline being vertically connected to the first beeline and the second L-shape section; the fourth beeline including a third end and a fourth end; the third end being vertically connected to a fifth beeline, and the fourth end being connected to a second neck portion that is further connected to a second rectangle portion; a width of the second neck portion being larger than a width of the first neck portion.

Preferably, the label chip adopts an RFID frame.

Preferably, a scale of the frame $L_8$ is 1.5 mm, $L_9$ is 1.0 mm, $W_8$ is 0.5 mm, $W_{10}$ is 1.0 mm; a bandwidth of the frame is 145 MHz, and a return loss is averagely larger than 6 dB.

Preferably, a scale of the frame $L_8$ is 1.75 mm, $L_9$ is 1.0 mm, $W_8$ is 1.0 mm, $W_{10}$ is 1.5 mm; a bandwidth of the frame is 154 MHz, and the return loss is averagely larger than 6 dB.

Preferably, a scale of a frame of the antenna module $L_8$ is 1.0 mm, $L_9$ is 0.5 mm, $W_8$ is 0.5 mm, $W_{10}$ is 1.0 mm; a bandwidth of the frame is 113 MHz, and the return loss is averagely larger than 6 dB.

Advantages over the present invention are as follows:

1. The manufacturing costs are largely decreased, the interference from metal is efficiently restrained, and a broadband effect is achieved.

2. The second plane of the antenna is not punched, but the miniaturization is still favorably achieved.

3. When the present invention is applied in the microstrip antenna for restraining metal, a broadband effect is also achieved.

4. The present invention is suited to RFID label (tag) antenna of multinational frequencies.

5. The present invention operatively restrains interference from metal and keeps characteristics of the microstrip antenna.

6. The symmetrical and unsymmetrical structures provide resonance and result in dual mode so as to achieve a broadband effect.

7. The broadband is operable, and the operation thereof is free.

8. The manufacturing costs are lessened, so it is profitable for the present invention to be applied in various countries.

9. When the present invention is tactically sold to America, it may occupy a certain proportion in the market that especially sells high-quality RFID tag antenna.

DETAILED DESCRIPTION OF THE PREFERRED EMBODIMENTS

Figure 1:
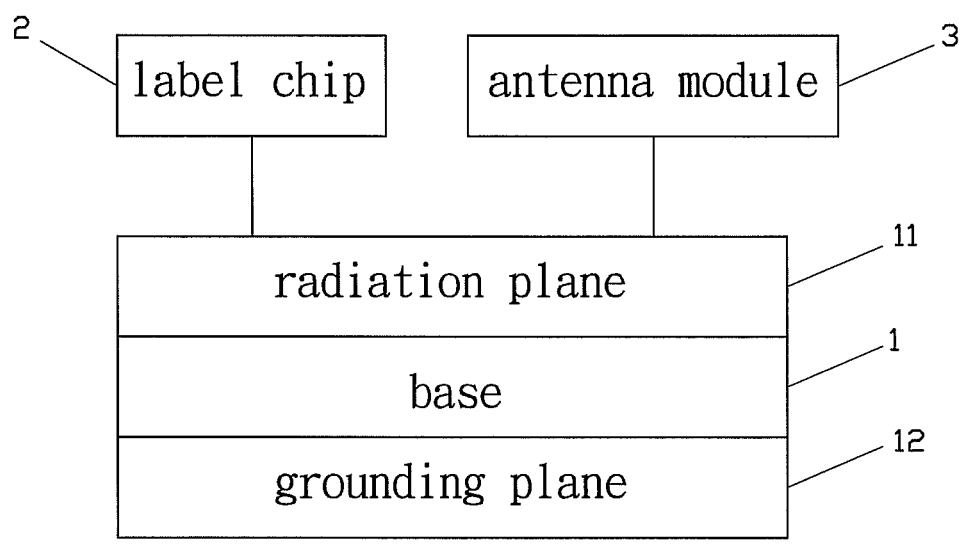
FIG. 1 is a schematic view showing the arrangement of a first preferred embodiment of the present invention.
Figure 2:
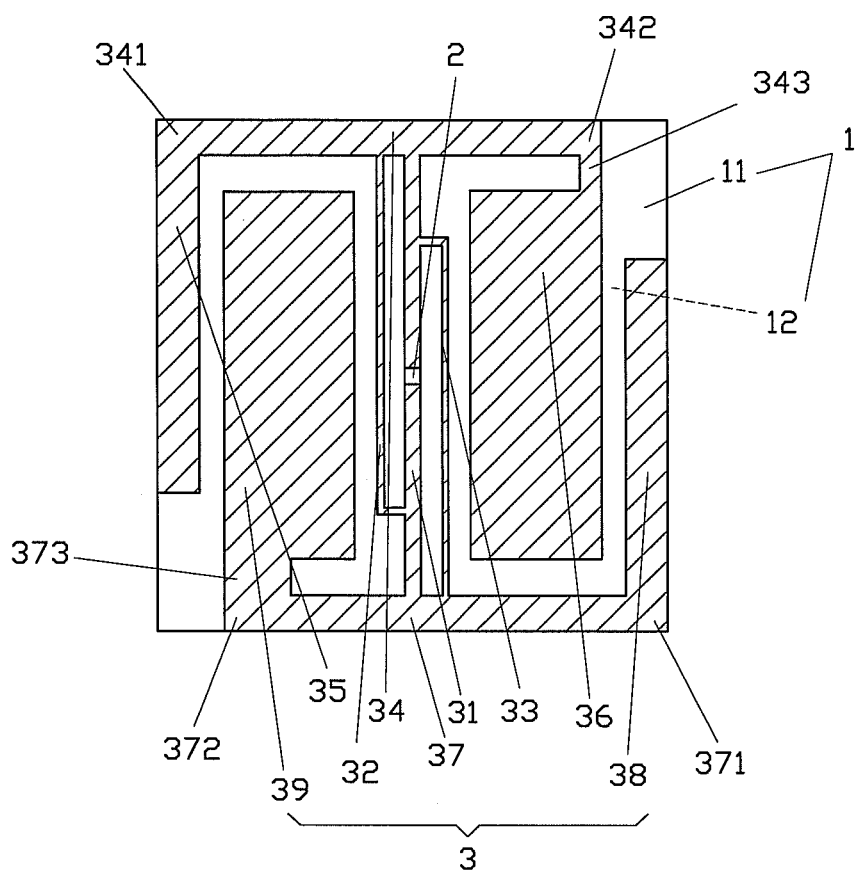
FIG. 2 is a plan view showing the structure of the first preferred embodiment of the present invention.
Figure 3:
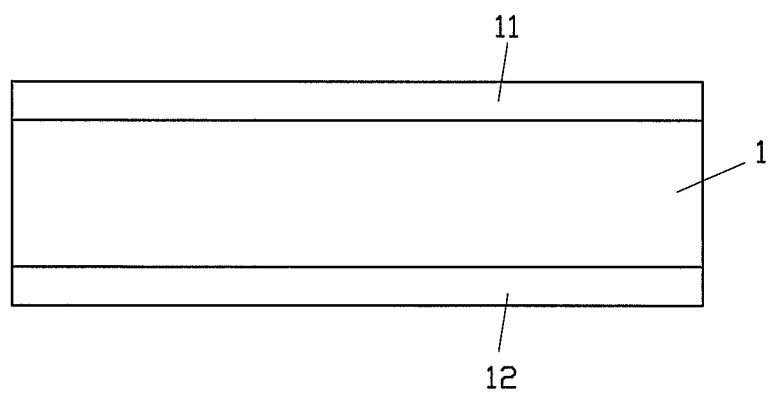
FIG. 3 is a side view showing the structure of the first preferred embodiment of the present invention.

Referring to FIGS. 1 to 3, a schematic view showing the arrangement, a plan view showing the structure, and a side view showing the structure of the present invention are provided. A broadband RFID label (tag) antenna for metal comprises a base 1, a label chip 2, and an antenna module 3. Details are as follows:

The base 1 includes a first plane 11 and a second plane 12. The first plane 11 and the second plane 12 of the base 1 are separated.

The label chip 2 is disposed on the first plane 11 of the base 1, and the label chip 2 adopts an RFID frame.

The antenna module 3 disposed on the first plane 11 of the base 1 includes a first beeline 31 at a middle thereof. The label chip 2 is disposed at a middle of the first beeline. A first L-shape section 32 and a second L-shape section 33 are respectively and symmetrically extended from the first beeline 31. A second beeline 34 is vertically connected to the first beeline 31 and the first L-shape section 32. The second beeline 34 includes a first end 341 and a second end 342. The first end 341 is vertically connected to a third beeline 35, and the second end 342 is connected to a first neck portion 343 that is further connected to a first rectangle portion 36. A fourth beeline 37 is vertically connected to the first beeline 31 and the second L-shape section 33. The fourth beeline includes a third end 371 and a fourth end 372. The third end 371 is vertically connected to a fifth beeline 38, and the fourth end 372 is connected to a second neck portion 373 that is further connected to a second rectangle portion 39. A width $W_3$ of the second neck portion 373 is larger than a width $W_4$ of the first neck portion 343.

Figure 10:
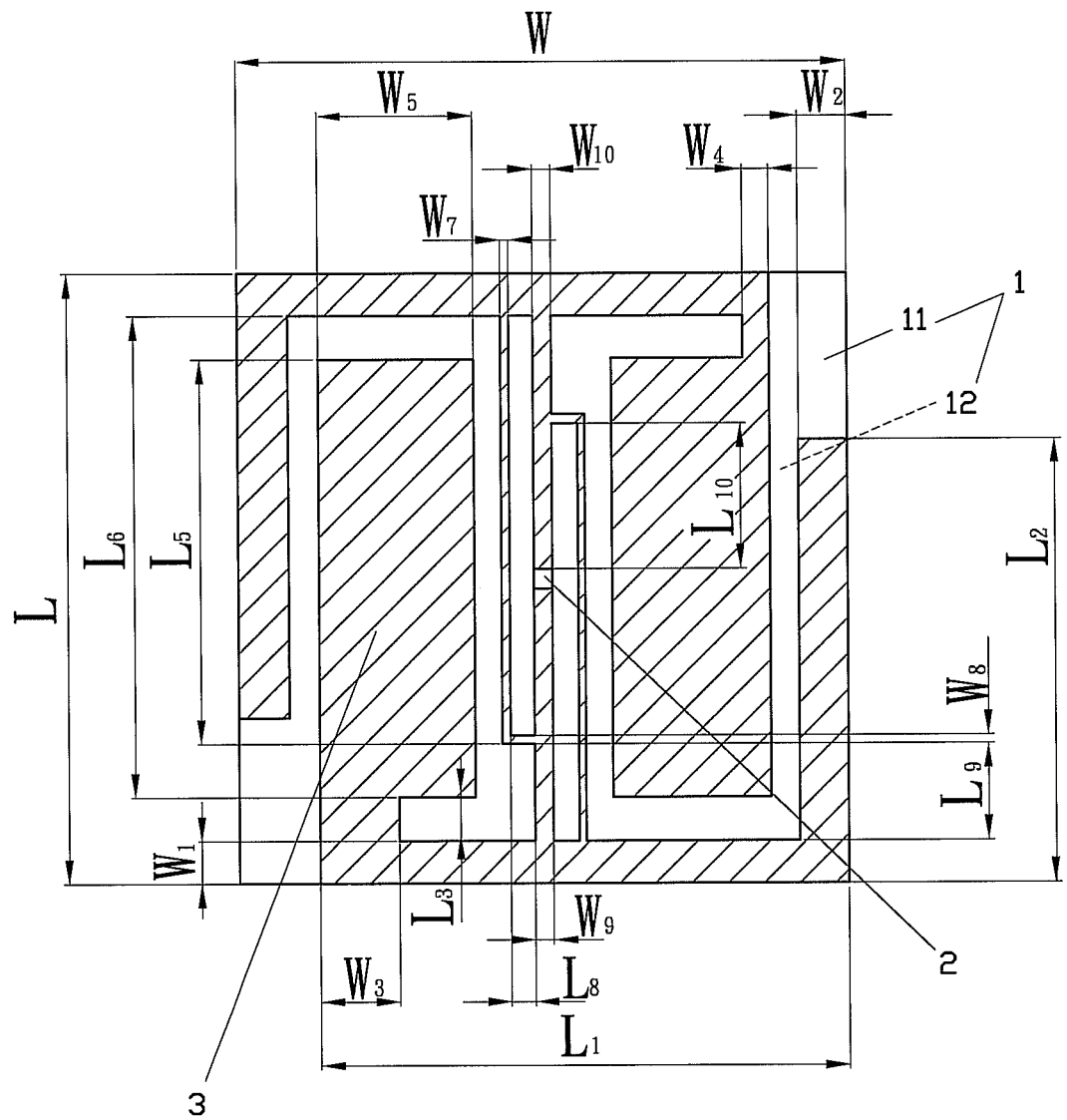
FIG. 10 is a schematic view showing the integral scale of the first preferred embodiment of the present invention.

In practice, referring to FIG. 10, the printed RFID tag antenna is designed as follows: When thickness is 0.8 mm, the dielectric coefficient is 4.4, the loss tangent is 0.0245, and the area is W=35 mm by L=35 mm. The chip (RX-UHF-11111-0) is manufactured by TI, TEXASS INSTRUMENTS). The impedance value of the label chip is about 10-j60Ω in 915 MHz. Namely, the label chip has to be designed 10+j60Ω in 915 MHz, so that the chip impedance and the antenna impedance are able to achieve conjugate match and accomplish the largest power transfer.

Figure 4:
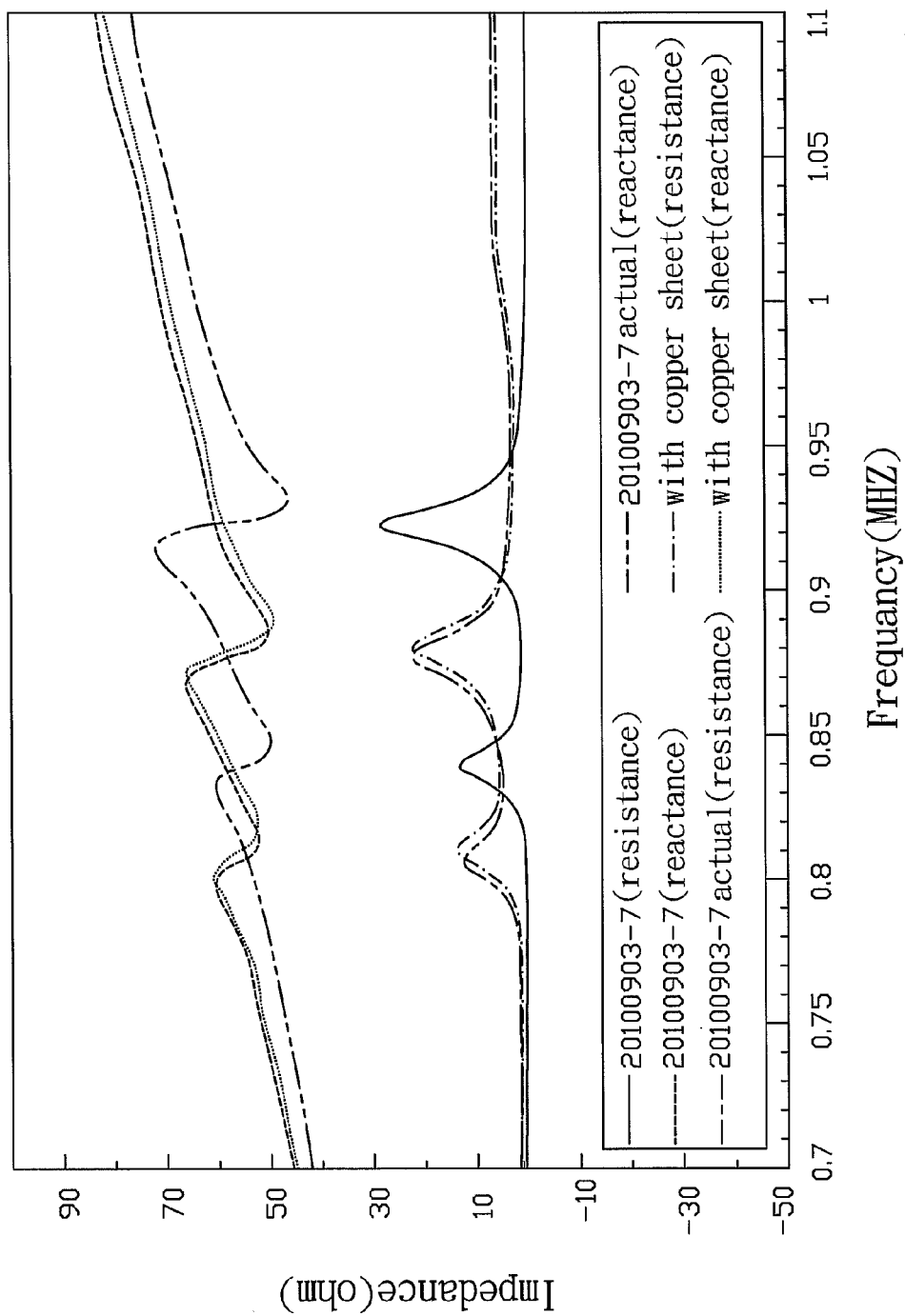
FIG. 4 shows impedance of resistance and reactance of the first preferred embodiment of the present invention.
Figure 5:
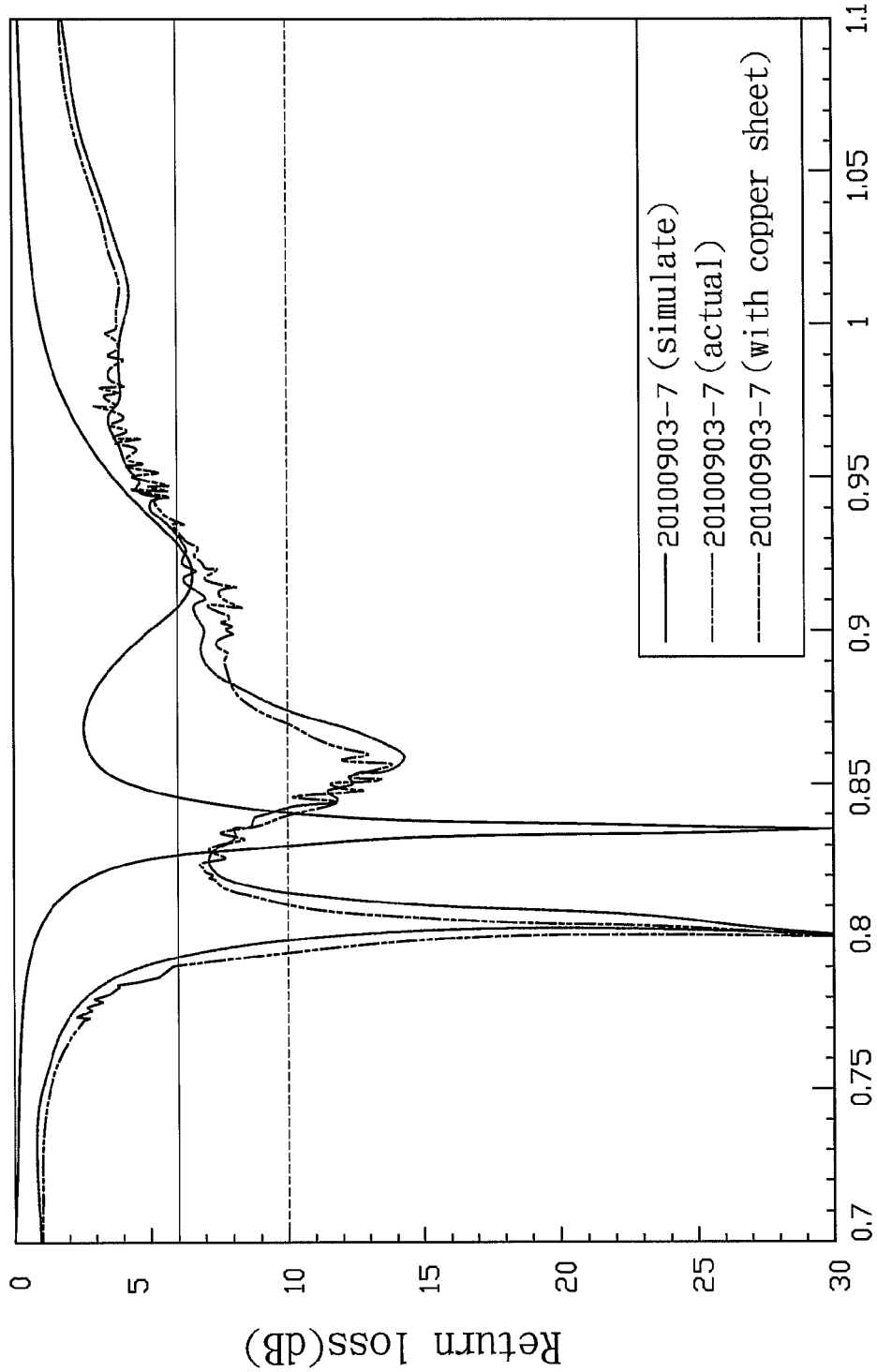
FIG. 5 shows a return loss of the first preferred embodiment of the present invention.

FIGS. 4 and 5 respectively show impedance and return loss of resistance and reactance of the first preferred embodiment of the present invention. We can see from FIG. 4 that the ultra-wideband is generated by double resonances in this frame. One of the resonances is 920 MHz, and it is generated by skew symmetry. The other one is achieved since the widths $W_3$ and $W_4$ (as shown in FIG. 10) are different, and an unsymmetrical mode is accordingly resulted in 840 MHz.

Referring to FIG. 5, the return loss of the frame is resulted from the network analyzer testing the resistance and the reactance and thereby proceeding to conversion by formulas. The bandwidth of this frame is 145 MHz (790 MHz to 935 MHz), and the return loss thereof is averagely larger than 6 dB. When a copper sheet of 10 mm×10 mm is added on the back of the radiation, the frame further proves that it can be installed on metal, and the metal interference is efficiently restrained.

Figure 6:
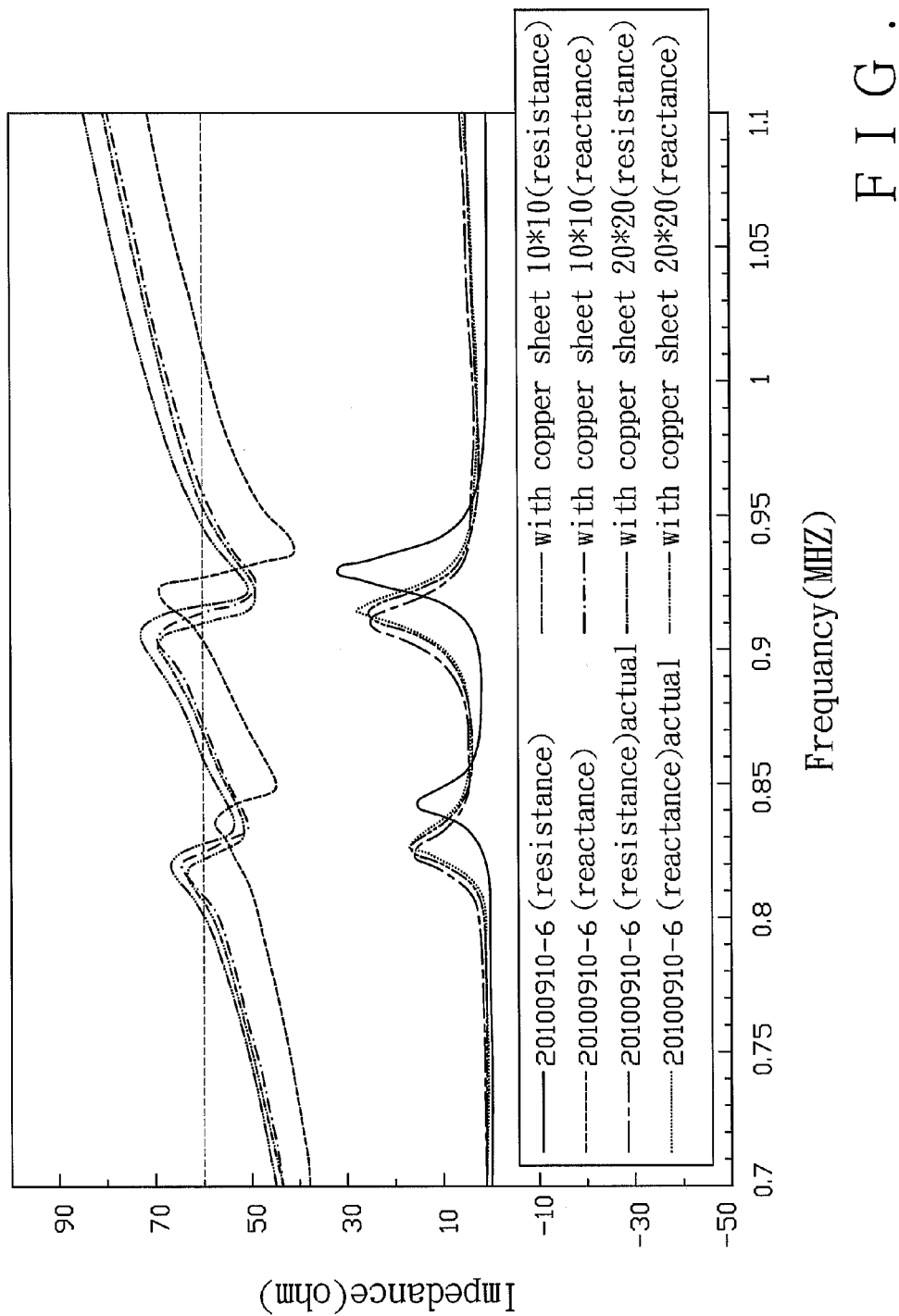
FIG. 6 shows impedance of resistance and reactance of a second preferred embodiment of the present invention.
Figure 7:
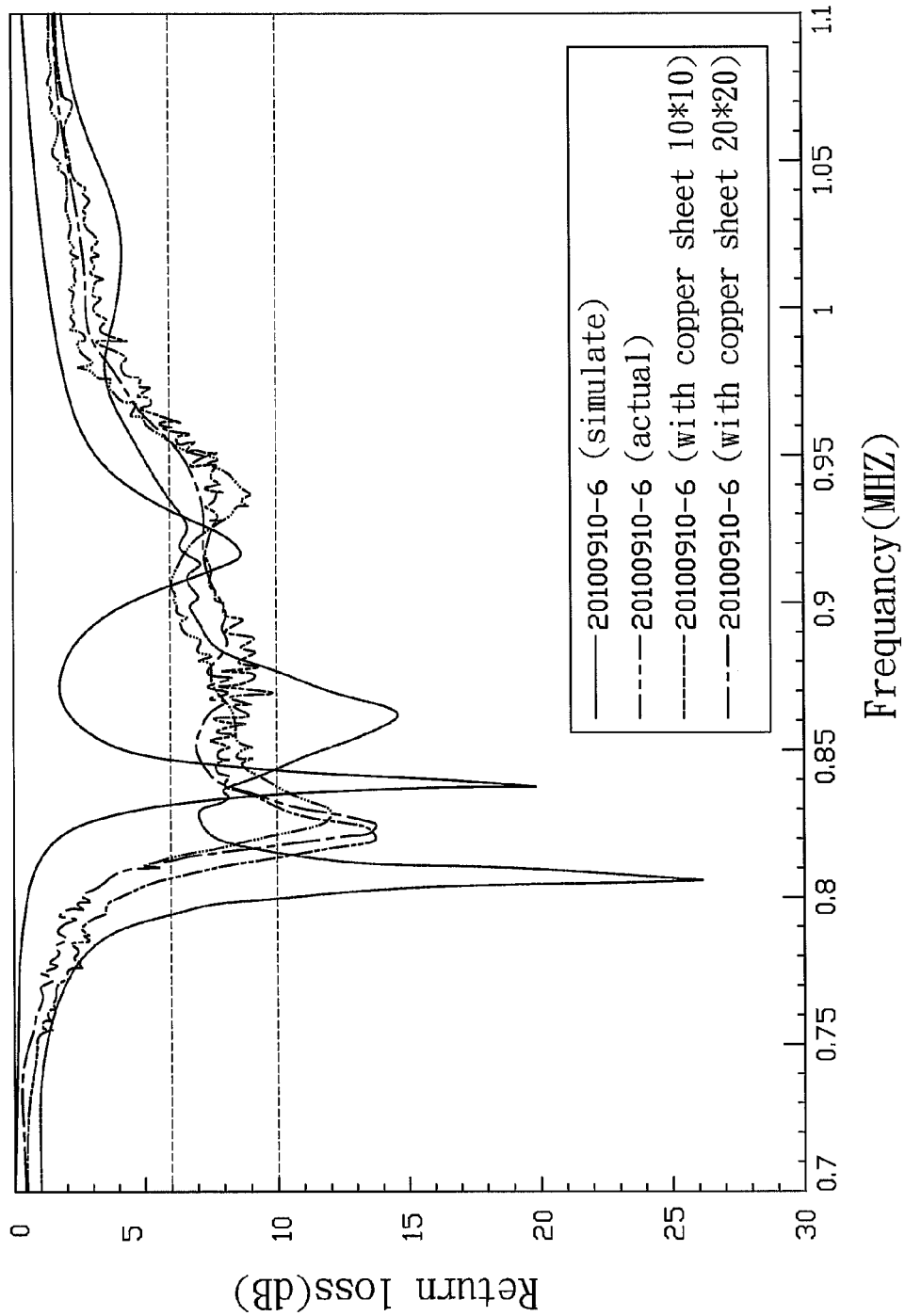
FIG. 7 shows the return loss of the second preferred embodiment of the present invention.

FIGS. 6 and 7 respectively show impedance and return loss of resistance and reactance of the second preferred embodiment of the present invention. The content in FIG. 6 is actually the content in FIG. 10, but there are a few changes. Namely, $L_8=1.5$ mm is adjusted to 1.75 mm, $W_8=0.5$ mm is adjusted to 1.0 mm, and $W_{10}=1.0$ mm is adjusted to 1.5 mm. We can see from FIG. 6 that the resistance does not change a lot, but the center of the inflection point of the reactance raises.

Referring to FIG. 7, the return loss of the frame shows that the bandwidth is added to 154 MHz from 145 MHz. Herein, although the bandwidth is increased, the interference is also incurred after the copper sheet is attached. However, the large bandwidth can not be regardless.

Figure 8:
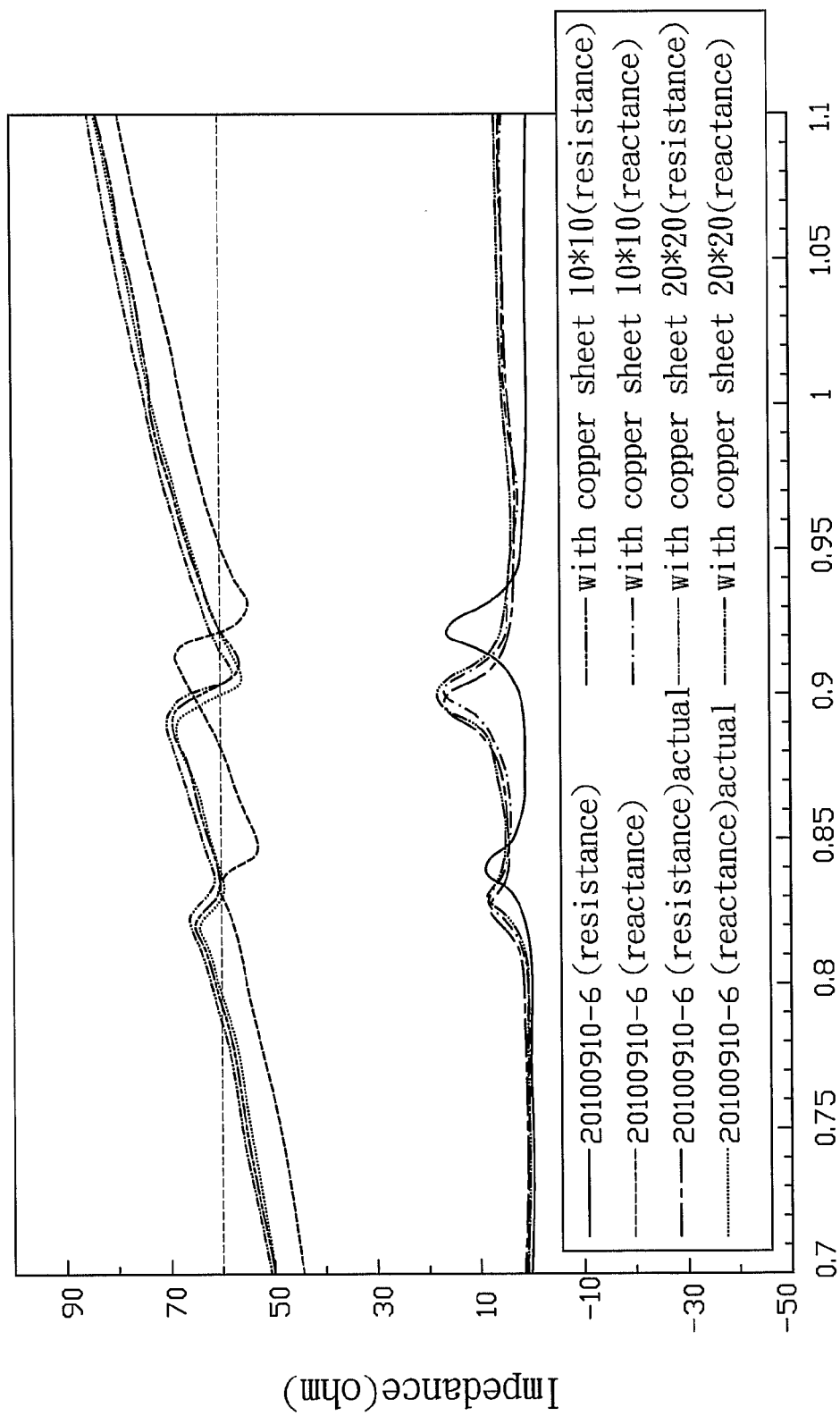
FIG. 8 shows impedance of resistance and reactance of a third preferred embodiment of the present invention.
Figure 9:
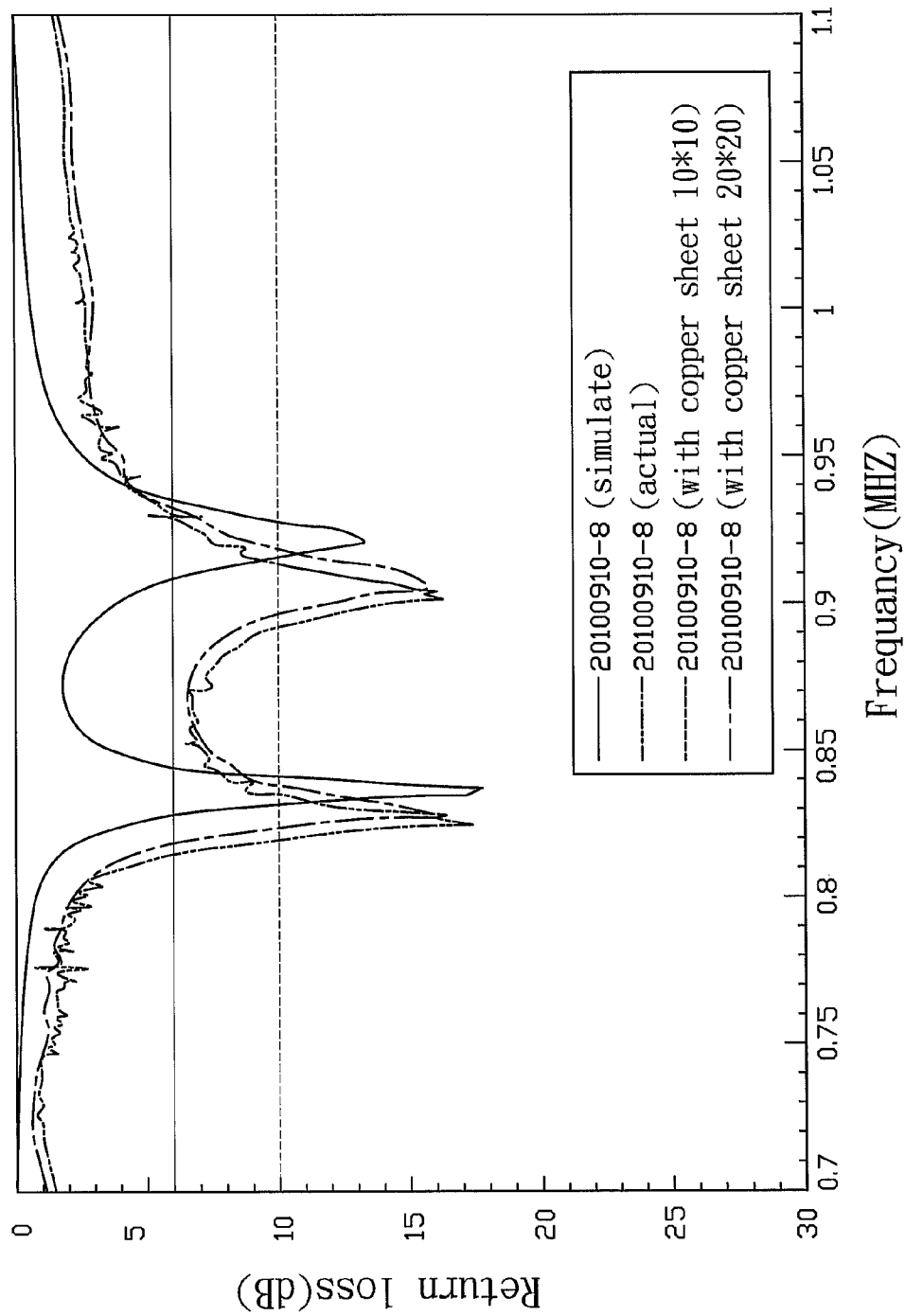
FIG. 9 shows the return loss of the third preferred embodiment of the present invention.

FIGS. 8 and 9 respectively show impedance and return loss of resistance and reactance of the third preferred embodiment of the present invention. The content in FIG. 8 is actually the content in FIG. 10, but there are a few changes. Namely, $L_8=1.5$ mm is adjusted to 1.0 mm, and $L_9=1.0$ mm is adjusted to 0.5 mm. We can see from FIG. 8 that the resistance does not change a lot, but the center of the inflection point of the reactance raises, and concurrently, the change amount of the inflection point lessens.

Referring to FIG. 9, the return loss of the frame shows that the bandwidth is decreased to 113 MHz from 145 MHz. The bandwidth is shrunk in this frame; however, no matter a 10 mm×10 mm copper or a 20 mm×20 mm copper sheet is added, no metal interference is observed from the return loss. Therefore, although this frame slightly lessens the bandwidth, the metal interference is favorably restrained.

To sum up, the broadband RFID label (tag) antenna comprises the base 1, the label chip 2, and the antenna module 3 for being applied in the surface of metal object. Accordingly, the microstrip antenna having a miniaturized label antenna is accomplished. The dual mode conquers problems brought about by the narrowband existing in the microstrip antenna; the antenna is further miniaturized by bending. Moreover, a favorable impedance match is kept between the antenna and the chip. As a result, the present invention carries out a best mode to the technology of the broadband RFID label (tag) antenna.

We claim:

1. A broadband RFID label (tag) antenna for metal comprising:
   a base including a first plane and a second plane; said first plane and said second plane being separated by a dielectric layer;
   a label chip disposed on said first plane of said base;
   an antenna module disposed on said first plane of said base, and said antenna module including a first beeline at a middle of said first plane; said label chip being correspondingly disposed at a middle of said first beeline; a first L-shape section and a second L-shape section being respectively and symmetrically extended from said first beeline; a second beeline being vertically connected to said first beeline and said first L-shape section; said second beeline including a first end and a second end; said first end being vertically connected to a third beeline, and said second end being connected to a first neck portion that is further connected to a first rectangle portion; a fourth beeline being vertically connected to said first beeline and said second L-shape section; said fourth beeline including a third end and a fourth end; said third end being vertically connected to a fifth beeline, and said fourth end being connected to a second neck portion that is further connected to a second rectangle portion; a width of said second neck portion being larger than a width of said first neck portion.

2. The broadband RFID label (tag) antenna as claimed in claim 1, wherein, said label chip adopts an RFID frame.

3. The broadband RFID label (tag) antenna as claimed in claim 2, wherein, a scale of said frame $L_8$ is 1.5 mm, $L_9$ is 1.0 mm, $W_8$ is 0.5 mm, $W_{10}$ is 1.0 mm; a bandwidth of said frame is 145 MHz, and a return loss is averagely larger than 6 dB, and
   wherein $L_8$ is a distance between the first beeline and the first L-shape section, $L_9$ is a distance between the fourth beeline and the first L-shape section, $W_8$ is a width of the first L-shape section, and $W_{10}$ is a width of the first beeline.

4. The broadband RFID label (tag) antenna as claimed in claim 2, wherein, a scale of said frame $L_8$ is 1.75 mm, $L_9$ is 1.0 mm, $W_8$ is 1.0 mm, $W_{10}$ is 1.5 mm; a bandwidth of said frame is 154 MHz, and a return loss is averagely larger than 6 dB, and
   wherein $L_8$ is a distance between the first beeline and the first L-shape section, $L_9$ is a distance between the fourth beeline and the first L-shape section, $W_8$ is a width of the first L-shape section, and $W_{10}$ is a width of the first beeline.

5. The broadband RFID label (tag) antenna as claimed in claim 2, wherein, a scale of a frame of said antenna module $L_8$ is 1.0 mm, $L_9$ is 0.5 mm, $W_8$ is 0.5 mm, $W_{10}$ is 1.0 mm; a bandwidth of said frame is 113 MHz, and a return loss is averagely larger than 6 dB, and
   wherein $L_8$ is a distance between the first beeline and the first L-shape section, $L_9$ is a distance between the fourth beeline and the first L-shape section, $W_8$ is a width of the first L-shape section, and $W_{10}$ is a width of the first beeline.

* * * * *